United States Patent
Ng et al.

(10) Patent No.: US 8,441,242 B2
(45) Date of Patent: May 14, 2013

(54) DIGITALLY CONTROLLED INTEGRATED DC-DC CONVERTER WITH TRANSIENT SUPPRESSION

(75) Inventors: Wai Tung Ng, Thornhill (CA); Jing Wang, Toronto (CA); Kendy Ng, Richmond Hill (CA); Haruhiko Nishio, Matsumoto (JP); Masahiro Sasaki, Azumino (JP); Tetsuya Kawashima, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 377 days.

(21) Appl. No.: 12/794,506

(22) Filed: Jun. 4, 2010

(65) Prior Publication Data

US 2011/0298439 A1    Dec. 8, 2011

(51) Int. Cl.
    *G05F 1/00*    (2006.01)
(52) U.S. Cl.
    USPC .......................................... 323/273; 323/283
(58) Field of Classification Search .................. 323/273, 323/283
    See application file for complete search history.

(56) References Cited

U.S. PATENT DOCUMENTS

| | | | |
|---|---|---|---|
| 5,636,106 A * | 6/1997 | Batarseh et al. | 363/16 |
| 7,609,040 B1 * | 10/2009 | Jain | 323/283 |
| 7,902,800 B2 * | 3/2011 | Jain et al. | 323/224 |
| 2008/0157742 A1 * | 7/2008 | Martin et al. | 323/284 |
| 2008/0310200 A1 * | 12/2008 | Maksimovic et al. | 363/65 |
| 2009/0174262 A1 * | 7/2009 | Martin et al. | 307/82 |

OTHER PUBLICATIONS

Zhao, Zhenyu et al., "Limit-Cycle Oscillations Based Auto-Tuning System for Digitally Controlled DC-DC Power Supplies", IEEE Trans. Power Electronics, vol. 22, No. 6, pp. 2211-2222, Nov. 2007.
Trescases, Olivier et al., "A Digitally Controlled DC-DC Converter Module with a Segmented Output Stage for Optimized Efficiency", Proc. Int. Symp. Power Semiconductor Devices and ICs, Jun. 2006, pp. 373-376.
Zhao, April et al., "One-Step Digital Dead-Time Correction for DC-DC Converters", Applied Power Electronics Conf.,Feb. 2010, pp. 132-137.
Radic, Aleksandar et al., "Minimum Deviation Digital Controller IC for Single and Two Phase DC-DC Switch-Mode Power Supplies", Applied Power Electronics Conf.,Feb. 2010, pp. 1-6.
Wong, P.L. et al., "Critical Inductance in Voltage Regulator Modules", IEEE Transaction on Power Electronics, vol. 17, No. 4, Jul. 2002, pp. 485-492.

(Continued)

*Primary Examiner* — Adolf Berhane
*Assistant Examiner* — Emily Pham
(74) *Attorney, Agent, or Firm* — Rossi, Kimms & McDowell LLP

(57) ABSTRACT

A fully integrated DC-DC converter utilizes digitally controlled dual output stages to achieve fast load transient recovery is presented. The DC-DC converter includes a main converter output stage connected in parallel with an auxiliary output stage. The main output stage is responsible for steady-state operation and is designed to achieve high conversion efficiency using large inductor and power transistors with low on-resistance. The auxiliary stage is responsible for transient suppression and is only active when a load transient occurs. The auxiliary output stage performs well with inductor and power transistors much smaller than those of the main switching stage and thus achieves well balanced power conversion efficiency and dynamic performance with a much smaller area penalty than previously described dual-output-stage converters.

9 Claims, 9 Drawing Sheets

OTHER PUBLICATIONS

Liu, Pang-Jung et al., "A Fast Transient Recovery Module for DC-DC Converters", IEEE Transactions on Industrial Electronics, vol. 56, No. 7, pp. 2522-2529, Jul. 2009.

NG, Kendy et al., "A Digitally Controlled Transient Suppression Method for Integrated DC-DC Converters", IEEE International Conference on Electron Devices and Solid-State Circuits (EDSSC), Dec. 2008.

Meyer, Eric et al., "An Optimal Control Method for Buck Converters Using a Practical Capacitor Charge Balance Technique", IEEE Transactions on Power Electronics, vol. 23, No. 4, pp. 1802-1812, Jul. 2008.

Wang, J. et al. "Integrated DC-DC Converter with an Auxiliary Output Stage for Transient Suppression", in Proc. Electron Device and Solid State Circuits, Nov. 2009, pp. 380-383.

* cited by examiner

FIG. 4
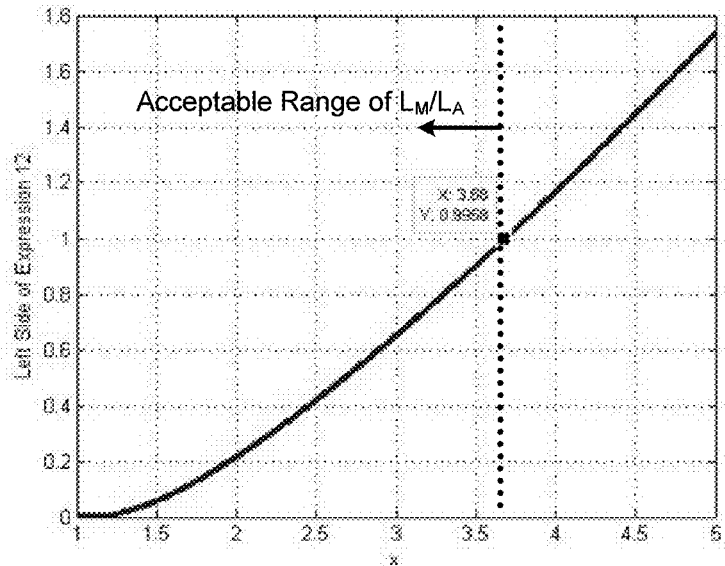
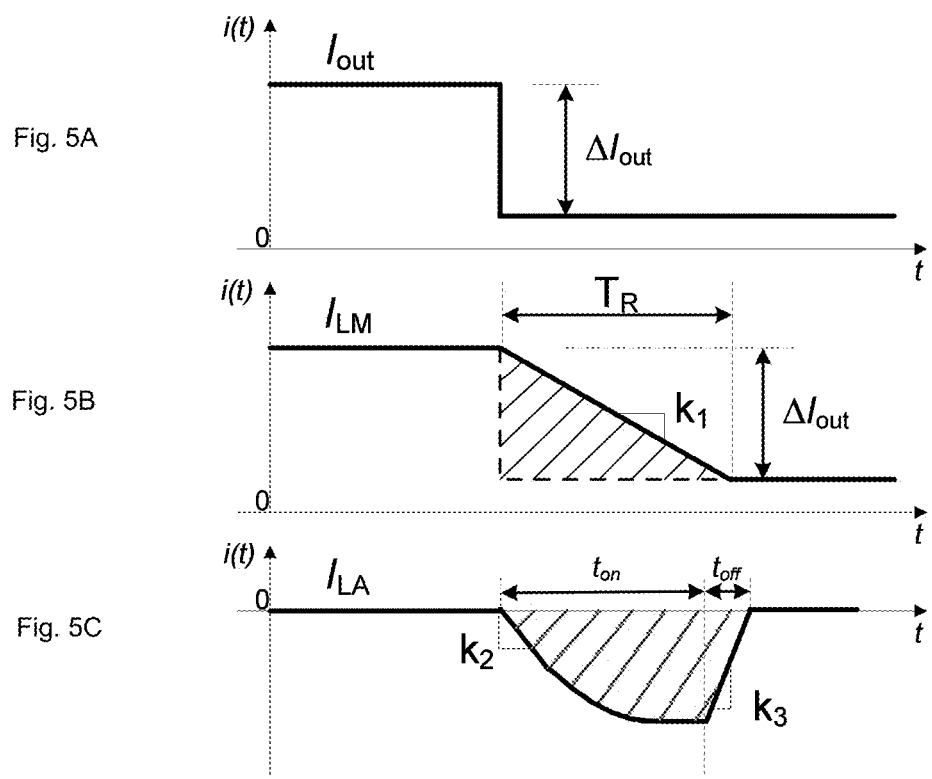
Fig. 5A
Fig. 5B
Fig. 5C

DIGITALLY CONTROLLED INTEGRATED DC-DC CONVERTER WITH TRANSIENT SUPPRESSION

FIELD OF THE INVENTION

The present invention relates in general to digitally controlled integrated DC-DC converters. More specifically, the present invention relates to a digitally controlled integrated DC-DC converter that incorporates transient suppression.

BACKGROUND

Digitally controlled DC-DC converters have shown more flexibility over their analog counterparts with the introduction of intelligent control techniques. The intelligent control techniques include, for example, the use of an auto-tuning system that can tolerate passive component variations as described in "Limit-cycle oscillations based auto-tuning system for digitally controlled DC-DC power supplies", by Z. Zhao, A. Prodić, *IEEE Trans. Power Electronics*, vol. 24, no. 6, pp. 2211-2222, November 2007, the use of a segmented output stage that can dynamically adjust the size of the output transistors according to load conditions to maintain high power conversion efficiency as described in "A digitally controlled DC-DC converter module with a segmented output stage for optimized efficiency", by O. Trescases, W. T. Ng, H. Nishio, M. Edo and T. Kawashima, *Proc. Int. Symp. Power Semiconductor Devices and ICs*, June 2006, pp. 373-376, and the one-step dead-time correction that can optimize the turn-on and turn-off dead-time for power transistors on-the-fly as described in "One-step digital dead-time correction for DC-DC converters", by A. Zhao, A. A. Fomani and W. T. Ng, *Proc. Applied Power Electronics Conf.*, February 2010, pp. 132-137. In addition, digitally controlled DC-DC converters have the ability to switch seamlessly between linear and nonlinear operation modes and achieve near-optimal load transient performance as described in "Minimum deviation digital controller IC for single and two phase DC-DC switch-mode power supplies", by A. Radic, Z. Lukic, A. Prodic and R. de Nie, *Proc. Applied Power Electronics Conf.*, February 2010, pp. 1-6.

As power supply requirements for microprocessors become more stringent, however, the design of power converters has become more challenging. Point-of-load (POL) DC-DC converters driving modern microprocessors need to provide low output voltage, high output current and good dynamic performance during load transients, while at the same time maintaining high efficiency. Smaller LC filters and higher switching frequency or multiphase/interleaved structure have been proposed to improve the converter's transient performance. See, for example, "Critical Inductance in Voltage Regulator Modules", P. L. Wong, F. C. Lee, Px Xu and K. Yao, *IEEE Transaction on Power Electronics*, Vol. 17, No. 4, July 2002, pp. 485-492. However, these solutions usually suffer from efficiency degradation. In order to address this problem, an additional power output stage with much smaller filter inductance has been added to the main converter to reduce the output voltage overshoot without deteriorating the steady-state efficiency. See, for example, "A fast transient recovery module for DC-DC converters", by P. J. Liu, H. J. Chiu, Y. K. Lo, and Y.-J. E. Chen, *IEEE Trans. Industrial Electronics*, vol. 56, no. 7, pp. 2522-2529, July 2009, the content of which is incorporated herein by reference. However, depending on the implementation, the use of auxiliary stages can take up valuable space.

A digitally controlled transient suppression method involving an auxiliary output stage connected in parallel with the main output stage has been proposed in "A Digitally Controlled Transient Suppression Method for Integrated DC-DC Converters", K. NG, J. Wang, and W. T. Ng, *IEEE International Conference on Electron Devices and Solid-State Circuits (EDSSC)*, December 2008, the content of which is incorporated herein by reference. In the digitally controlled transient suppression method, a capacitor charge balance principle is applied to bring the output voltage back to within a tolerable window in a single switching cycle, which in turn results in a very short recovery time. The auxiliary stage is used to assist the sinking or sourcing of the load current, which helps to restore the output voltage quickly when load transient occurs. It is desirable that that the auxiliary power transistors be much smaller than those in the main output stage. As a result, the total area required for dual output stages does not impose a significant overhead when compared to converters with a conventional single phase output stage, thereby making the auxiliary stage a method viable for integration.

In view of the above, it would therefore be desirable to provide a fully integrated DC-DC converter that achieves a fast load transient recovery, while at the same time achieving well balanced power conversion efficiency and dynamic performance without a significant area penalty.

SUMMARY OF THE INVENTION

A fully integrated DC-DC converter utilizes digitally controlled dual output stages to achieve fast load transient recovery is presented. The DC-DC converter includes a main converter output stage connected in parallel with an auxiliary output stage. The main output stage is responsible for steady-state operation and is designed to achieve high conversion efficiency using large inductor and power transistors with low on-resistance. The auxiliary stage is responsible for transient suppression and is only active when a load transient occurs. The auxiliary output stage performs well with inductor and power transistors much smaller than those of the main switching stage and thus achieves well balanced power conversion efficiency and dynamic performance with a much smaller area penalty than previously described dual-output-stage converters.

More specifically, in a preferred embodiment of the invention, the DC-DC converter includes a main converter output stage, an auxiliary converter output stage connected in parallel to the main converter output stage, and a digital controller coupled to the main converter output stage and the auxiliary converter output stage. The digital controller operates in a linear controller mode when no load transient is present and operates in a non-linear controller mode when a load transient is detected. The digital controller senses an output voltage slew-rate when the load transient is detected and determines a duty-ratio prediction that is applied in the linear controller mode to ensure smooth transition from the nonlinear controller mode back to the linear controller mode. The linear control mode is preferably a proportional-integral-derivative (PID) control mode.

The main converter output stage and the auxiliary converter output stage each include a high side switch, a low side switch and an inductor. The switches of both stages are coupled to the digital controller to enable the digital controller to control the operation of both stages. When no load transient is detected and the DC-DC converter is operated in a steady state condition, the digital controller disables the auxiliary converter output stage.

An on-resistance of auxiliary converter output stage power transistors provided in the auxiliary converter output stage is such that the auxiliary converter output stage active time is less than the main converter stage recovery time. This allows the size of the auxiliary converter output stage to be minimized.

In operation, the digital controller functions in a linear control mode when no load transient is detected by the digital controller in order to maintain the DC-DC converter in a steady state condition. The digital controller is then activated to operate in a non-linear control mode when a load transient is detected. The digital controller then performs load-step sensing in order to generate the necessary switching commands for the main converter output stage and the auxiliary converter output stage. In addition, the digital controller performs a duty-ratio prediction and applies it to the linear control mode to ensure a smooth transition from the non-linear control mode to the linear control mode. Further, a blocking state is preferably utilized until the output voltage of the converter settles to steady state.

These and other features, advantages, modifications and embodiments will become apparent to one skilled in the art after review of the following detailed description of the preferred embodiments of the invention and the accompanying drawings.

BRIEF DESCRIPTION OF THE DRAWINGS

The invention will be described with reference to certain preferred embodiments thereof and the accompany drawings, wherein:

FIG. 4 is a graph illustrating finding the range of inductance $L_M/L_A$;

FIGS. 5A-5C illustrate theoretical waveforms of load current ($I_{out}$), main stage inductor current ($I_{LM}$), auxiliary stage inductor current ($I_{LA}$) under heavy-to-light load transient taking into account the on-resistances of the auxiliary converter output stage switches for the DC-DC converter illustrated in FIG. 1;

DETAILED DESCRIPTION OF THE PREFERRED EMBODIMENTS OF THE INVENTION

Figure 1:
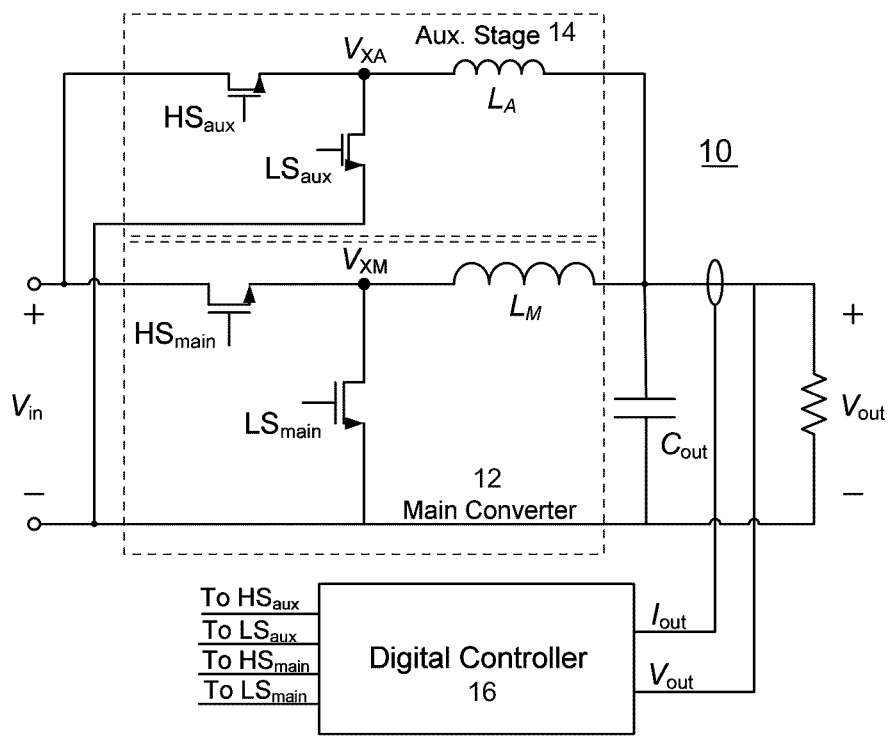
FIG. 1 is a schematic block diagram of a DC-DC converter incorporating digitally controlled dual output stages in accordance with the present invention.

A fully integrated DC-DC converter 10 that utilizes digitally controlled dual output stages to achieve fast load transient recovery in accordance with the present invention is shown in FIG. 1. As shown in FIG. 1, the DC-DC converter 10 includes a main converter output stage 12 connected in parallel with an auxiliary converter output stage 14. A digital controller 16 is provided to control the overall operation of the DC-DC converter 10. The main converter output stage 12 is responsible for steady-state operation and is designed to achieve high conversion efficiency using large inductor and power transistors with low on-resistance. The auxiliary converter output stage 14 is responsible for transient suppression, is only active when a load transient occurs, and is implemented with a smaller inductor so that is can source or sink current with a high slew-rate to quickly recover the output voltage to its steady-state value. The digital controller 16 generates switching commands for the main converter output stage 12 and the auxiliary converter output stage 14 using the charge balance principle described in "An optimal control method for buck converters using a practical capacitor charge balance technique", by E. Meyer, Z. Zhang, and Y. F. Liu, *IEEE Trans. Power Electronics*, vol. 23, no. 4, pp. 1802-1812, July 2008, the content of which is incorporated herein by reference, such that the amount of charge released through the auxiliary converter output stage 14 equals the excess charge injected by the main converter output stage 12.

An example of the theoretical current waveforms for both the main converter output stage 12 and the auxiliary output stage 14 during a heavy-to-light load transient are as illustrated in FIGS. 2A-2D. It is assumed that the DC-DC converter 10 reacts immediately to the load current step. After a load transient with magnitude $\Delta I_{out}$ is detected, the current $I_{LM}$ of the main converter output stage 12 inductor decreases with a constant slope of $k_1$ until it reaches the level of the new steady-state load current by the end of $T_R$. In the mean time, during $t_{on}$ the auxiliary converter output stage 14 inductor draws current $I_{LA}$ from the output capacitor at slope $k_2$, then ramps back to zero with a slope of $k_3$ through $t_{off}$. The three control parameters: main stage recovery time ($T_R$), auxiliary stage on-time ($t_{on}$) and auxiliary stage off-time ($t_{off}$) are determined by the digital controller 16 such that the capacitor charge released through the auxiliary converter output stage 14 equals the excess charge injected by the main converter output stage 12. By equating the area of the two shaded triangles in FIGS. 2B and 2C, these control parameters are calculated as:

$$T_R = \frac{\Delta I_{out}}{k_1}, \qquad (1)$$

$$t_{on} = \Delta I_{out} \sqrt{\frac{(V_{in} - V_{out})}{V_{in} k_1 k_2}}, \qquad (2)$$

$$t_{off} = \frac{k_2}{k_3} t_{on}, \qquad (3)$$

where

-continued $$k_1 = \frac{V_{out}}{L_M}, \tag{4}$$

$$k_2 = \frac{V_{out}}{L_A}, \tag{5}$$

$$k_3 = \frac{V_{in} - V_{out}}{L_A}. \tag{6}$$

The parameters $V_{in}$ and $V_{out}$ are the input and output voltages of the DC-DC converter 10, while $L_M$ and $L_A$ are the inductances in the main converter output stage 12 and the auxiliary output stage 14 respectively. For any given design, these values as well as $k_1$, $k_2$, and $k_3$ can be seen as known constants. The only unknown parameter needed to calculate $T_R$, $t_{on}$, and $t_{off}$ is the real-time load current step $\Delta I_{out}$.

Figure 3:
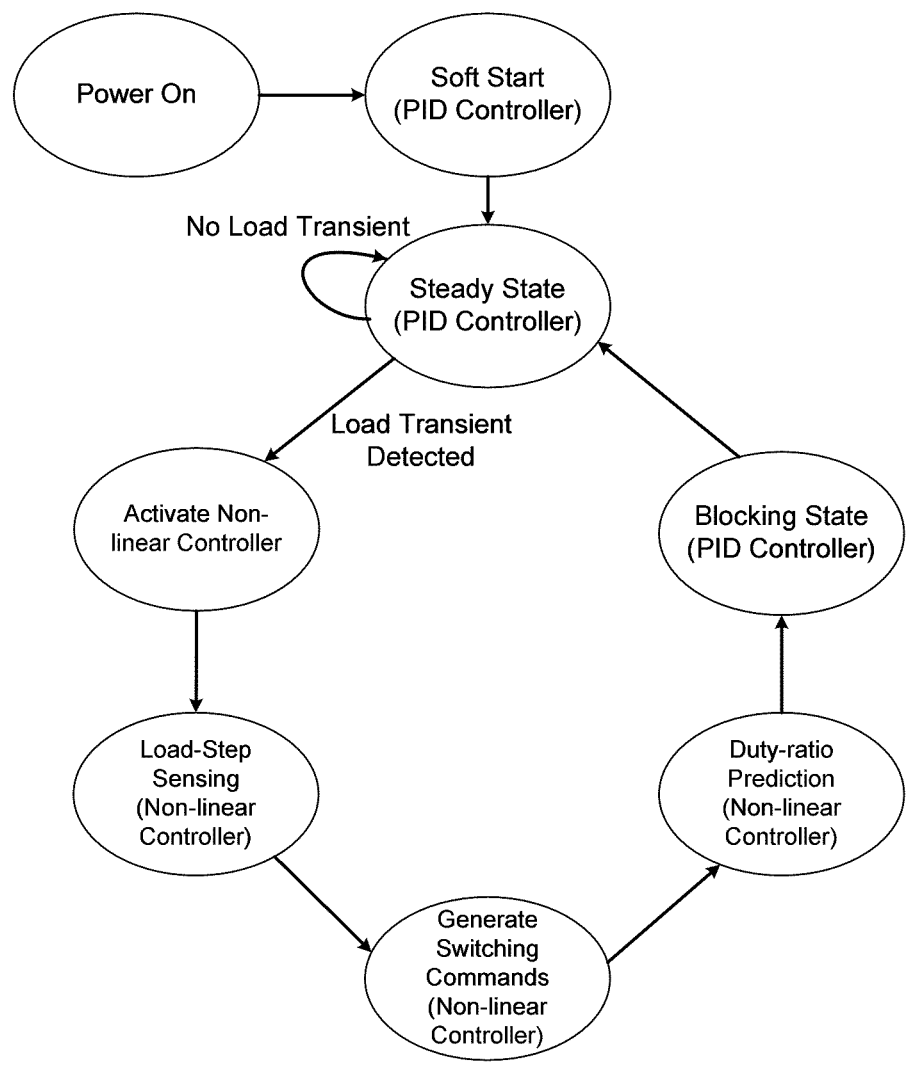
FIG. 3 is a state diagram illustrating the operation of a digital controller incorporated into the DC-DC converter illustrated in FIG. 1.

The digital controller 16 is implemented to generate the switching commands for the main converter output stage 12 and the auxiliary converter output stage 14 during both a steady state condition of operation and a transient recovery process. A state diagram illustrating a preferred operation of the digital controller 16 is shown in FIG. 3. After power up, the digital processor 16 soft starts when the output voltage gradually rises to its targeted value and settles in steady state condition under a conventional PID control mode. Only the main converter output stage 12 is active during this period. When a load transient is detected by the digital controller 16, the PID control mode is suspended and the system enters a non-linear control mode where both the main converter output stage 12 and auxiliary converter output stage 14 switch to perform transient recovery. The control parameters TR, ton, and toff for different load step Δ/out are calculated in advance from Equations (1)-(3) and programmed into a look-up table provided in the digital controller 16 (or memory associated therewith). The digital controller 16 simply uses sensed Δ/out as an index to determine TR, ton, toff and to generates the switching commands. By the end of transient recovery process, a new steady-state duty-ratio after transient is predicted in accordance with Δ/out. The new duty-ratio is then applied to the PID control mode when it reactivates to achieve seamless transition back to PID linear control. A short period of transient blocking state is introduced afterwards when the system is forced to operate with the PID control mode to prevent malfunctioning of the non-linear control until the output voltage fully settles. The blocking state ends when the sensed error signal of the output voltage stays around zero for a predetermined number of switching cycles. Due to the loss elements in the power path, the actual steady-state duty-ratio seen at the main converter output stage's switching node changes with different load current even if the ratio of output voltage over input voltage remains the same.

Figure 2:
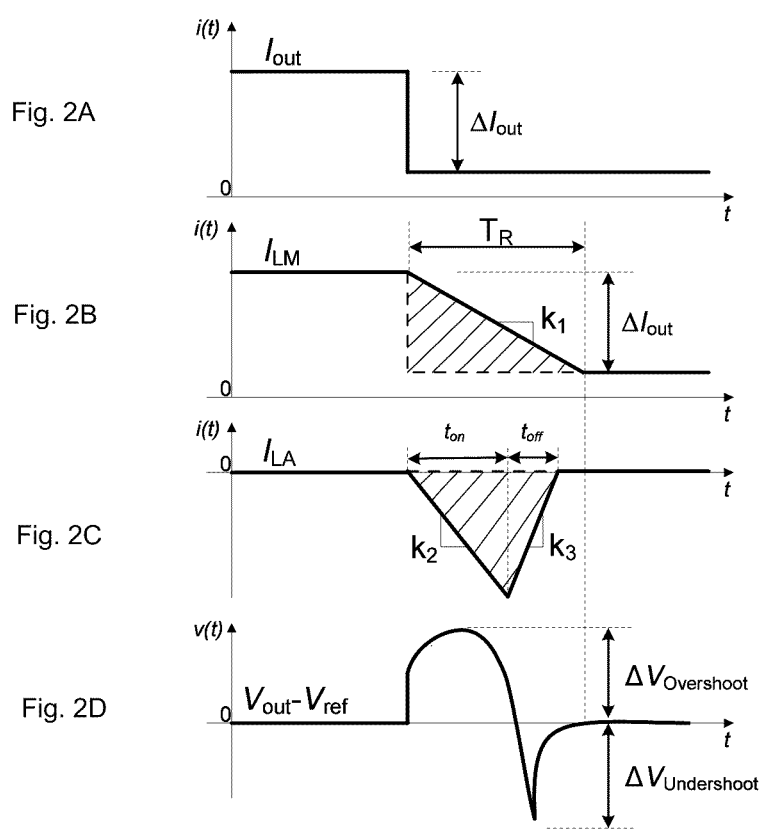
FIGS. 2A-2D respectively illustrate theoretical waveforms for load current ($I_{out}$), main stage inductor current ($I_{LM}$), auxiliary stage inductor current ($I_{LA}$) and output voltage variation ($V_{out}$-$V_{ref}$) under heavy-to-light load transient for the DC-DC converter illustrated in FIG. 1.

The ratio of inductance $L_M/L_A$ is preferably determined such that during transient recovery the induced output voltage undershoot $\Delta V_{Undershoot}$ is always less than or equal to the output voltage $\Delta V_{Overshoot}$ overshoot for ideal heavy-to-light load transients with arbitrary magnitude, as shown in FIG. 2D. For the converter under discussion, $\Delta V_{Overshoot}$ and $\Delta V_{Undershoot}$ can be derived as:

$$\Delta V_{Overshoot} = \frac{\Delta I_{out}^2}{2C_{out}} \cdot \frac{1}{k_1 + k_2}, \tag{7}$$

$$\Delta V_{Undershoot} = \frac{\Delta I_{out}^2}{2C_{out}} \cdot \frac{k_1}{1 - \frac{k_1}{k_3}} \cdot \left[\frac{1}{k_1} - \sqrt{\frac{1}{(1-D)k_1 k_2}}\right]^2, \tag{8}$$

$$\text{where } D = \frac{V_{out}}{V_{in}}, \tag{9}$$

$C_{out}$ is the converter's output capacitance and $k_1 \sim k_3$ are defined as in Equation (4)~(6). assuming $$\frac{L_M}{L_A} = x, \tag{10}$$

and letting $$\Delta V_{Undershoot} \leq \Delta V_{Overshoot}$$

by manipulating Equation (11), the following inequality is obtained:

$$\frac{1+x}{1 - \frac{D}{1-D} \cdot \frac{1}{x}} \cdot \left[1 - \sqrt{\frac{1}{(1-D)x}}\right]^2 \leq 1 \tag{12}$$

The left side of Equation (12) can be plotted in relation to x for any given combination of $V_{in}$ and $V_{out}$. The range of x that satisfies Equation (12) can be easily located graphically as shown in FIG. 4. A larger x is preferable since it results in a smaller auxiliary converter output stage inductor.

The size of the power transistors of the auxiliary converter output stage 14 is determined by analyzing the influence of their on-resistances $R_{on\_A}$. The theoretical current and output voltage waveforms taking into account $R_{on\_A}$ during a heavy-to-light transient are as illustrated in FIGS. 5A-5C. On-resistances of the power transistors of the main converter output stage 12 $HS_{main}$ and $LS_{main}$ are small due to the requirement of high steady-state efficiency. Thus its influence can be ignored and Equations (1) & (4) are viable. The voltage difference between $V_{in}$ and $V_{out}$ is much larger than the voltage drop across the high-side auxiliary transistor $HS_{Aux}$. Thus the waveform of $I_{LA}$ during $t_{on}$ can still be seen as linear and Equation (6) is viable. When the low-side auxiliary switch $LS_{Aux}$ is on, the expression of $I_{LA}$ during $t_{on}$ is as follows:

$$I_{LA}(t) = \frac{V_{out}}{R_{on\_A}}\left(1 - \exp\left(-\frac{R_{on\_A} t}{L_A}\right)\right). \tag{13}$$

and the expressions of capacitor charge from the two output stages are:

$$Q_{Main} \approx \frac{1}{2} T_R \Delta I_{out} = \frac{\Delta I_{out}^2}{2k_1}, \tag{14}$$

$$Q_{Aux} = \int_0^{t_{on}} I_{LA}(t_{on}) dt + \frac{I_{LA}(t_{on})^2}{2k_3} \tag{15}$$

By setting $$Q_{Main} = Q_{Aux} \tag{16}$$

$t_{on}$ can be solved from Equation (16) and $t_{off}$ is calculated as:

$$t_{off} = \frac{I_{LA}(t_{on})}{k_3}. \tag{17}$$

As will be discussed in greater detail, $R_{on\_A}$ must be small enough so that the resulting $t_{on}+t_{off}$ (auxiliary stage active time) is shorter than $T_R$ (main stage recovery time) under all possible $\Delta I_{out}$. For any given combination of $V_{in}$, $V_{out}$, $L_M$ and $L_A$, maximum allowable $R_{on\_A}$ can be found by letting $$t_{on}+t_{off}=T_R@\Delta I_{out\_max}. \tag{18}$$

Within the range of $R_{on\_A}$ larger $R_{on\_A}$ results in smaller auxiliary stage transistor but higher output voltage overshoot (in case of heavy-to-light load transient) due to reduced auxiliary current slew-rate. When $R_{on\_A}$ is selected by trading-off physical area and overshoot, actual transistor size can be determined according to the technology used for fabricating the components.

To illustrate the influence of $R_{on\_A}$ on the dynamic performance, a buck converter was designed and simulated in PSIM using the parameters in Table I. In steady state operation, the system relies on a traditional linear PWM controller to maintain regulation. The switching frequency is 390 kHz. When a load current step occurs, the system enters transient recovery mode as the main and auxiliary switches are controlled using the proposed method. By the end of recovery process the system returns to linear mode while the output voltage is regulated by the traditional PWM controller. The main output stage recovery time and auxiliary output stage turn-on and turn-off time under different $R_{on\_A}$ are calculated with MATLAB and applied to obtain the transient waveforms.

TABLE I

DESIGN PARAMETERS

| Parameter | Value |
|---|---|
| $V_{in}$ | 12 V |
| $V_{out}$ | 1 V |
| $L_M$ | 2.2 µH |
| $L_A$ | 820 nH |
| $R_{on\_M}$ | 25 mΩ |
| $R_{on\_A}$ | As specified |
| $\Delta I_{out}$ | −3 to +3 A |

Figure 6:
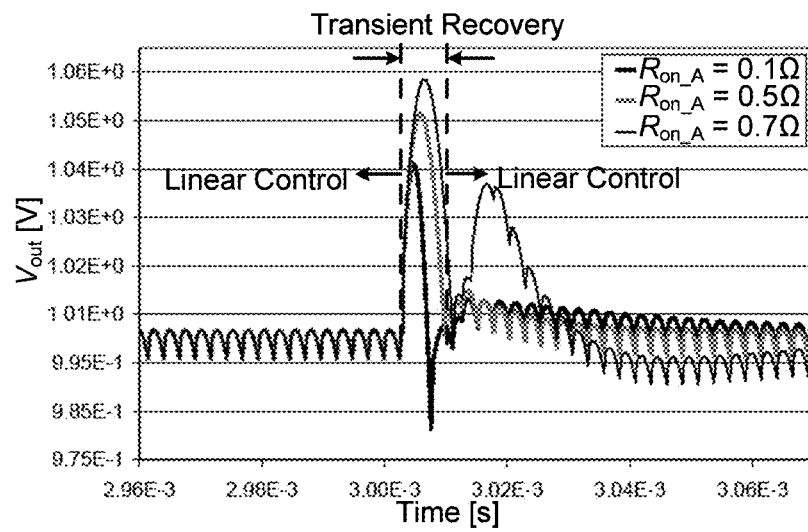
FIG. 6 is a graph illustrating dynamic performance of converters using auxiliary switches with different on resistances.

FIG. 6 shows the output voltage waveforms during a −3 A load transient. The case with $R_{on\_A}$=0.1Ω has the lowest overshoot (40 mV), but a 20 mV voltage undershoot during transient recovery is observed. For $R_{on\_A}$=0.5Ω, the overshoot jumps up to 50 mV but the total voltage deviation is reduced by 10 mV compare to the former case where no undershoot is observed. In both of these cases, the output voltage settles immediately after transient recovery, achieving smooth transition to steady-state linear control. As $R_{on\_A}$ increases to 0.7Ω, the peak overshoot is increased to 58 mV and a secondary voltage bump occurs after the linear control takes over, which takes more than 20 additional switching cycles to settle.

Figure 7:
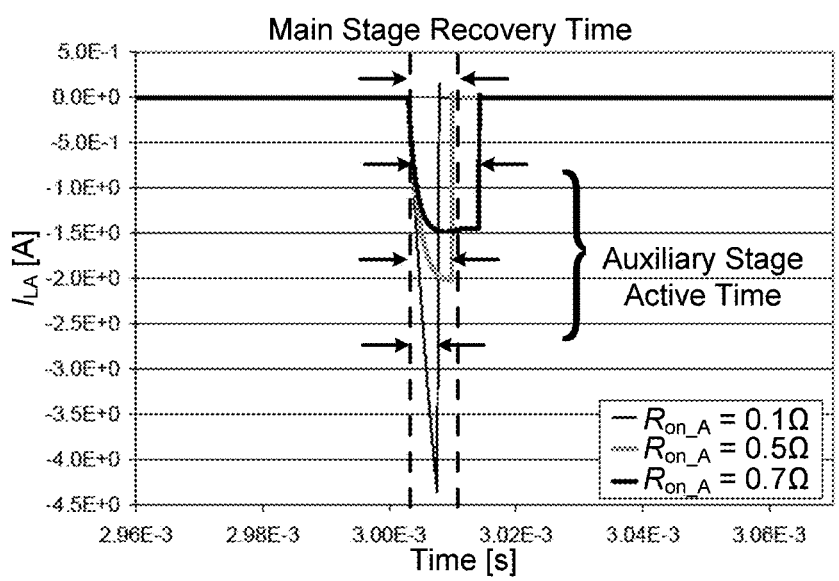
FIG. 7 is a graph illustrating transient current in the auxiliary switches with different on-resistances.

Changes in the output voltage waveform with $R_{on\_A}$ can be explained by analyzing the transient current waveforms in the auxiliary and main output stages. As indicated in FIG. 7, increasing the value of $R_{on\_A}$ would reduce the slew-rate of auxiliary output stage current $I_{LA}$ and cause it to saturate at a point where the voltage drop across the low-side auxiliary switch equal to $V_{out}$. Therefore, longer auxiliary output stage active time (the sum of $t_{on}$ and $t_{off}$) is required to achieve capacitor charge balance.

The voltage overshoot and undershoot during transient recovery mainly depends on the slew-rate of $I_{LA}$ and the maximum achievable current. When $R_{on\_A}$ increases from 0.1Ω to 0.5Ω, the peak auxiliary current drops from over 4 A to 2 A, causing slightly higher overshoot while eliminating undershoot in the output voltage. The same trend continues as $R_{on\_A}$ increases to 0.7Ω.

Figure 8:
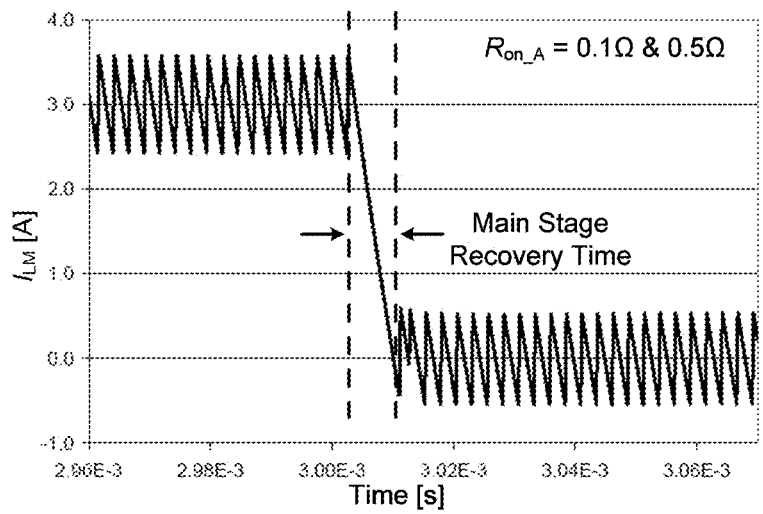
FIGS. 8 and 9 are graphs illustrating current in the main stage inductor.
Figure 9:
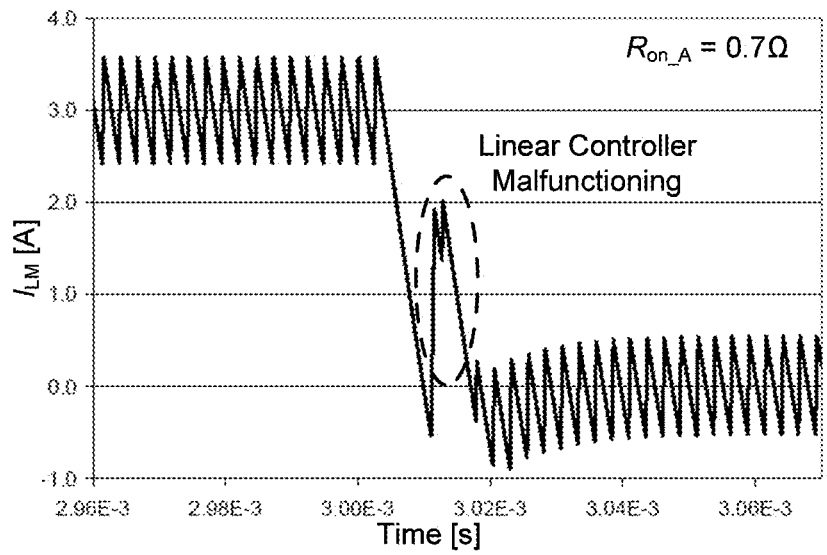

The settling of output voltage after the transition from transient recovery back to linear control is highly dependent on the main output stage recovery time and the auxiliary output stage active time. As can be observed from FIGS. 7-9, for $R_{on\_A}$ of 0.1Ω and 0.5Ω, the active time of the auxiliary output stage is shorter than the recovery time of the main output stage. Capacitor charge balance is achieved when the controller switches back to linear mode. The output voltage reaches its steady-state value at the transition point and settles thereafter. However, for $R_{on\_A}$=0.7Ω, the required active time of auxiliary output stage is longer than the recovery time for the main output stage and the capacitor charge is not balanced when the transition happens. After linear control takes over, it tries to regulate the output with the auxiliary output stage still active. Transfer function of the linear control loop is temporarily disturbed such that the controller will not function properly until the auxiliary output stage is turned off. This causes a secondary voltage bump and a long settling time.

Figure 10:
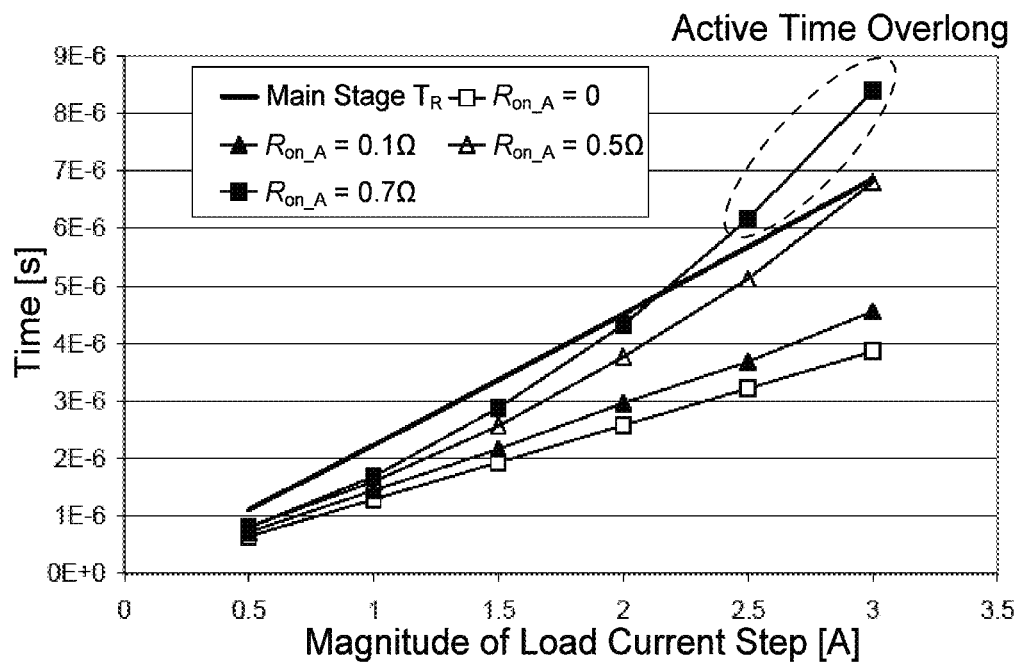
FIG. 10 is a graph illustrating a comparison of the active time for auxiliary output stages with different on-resistances.
Figure 11:
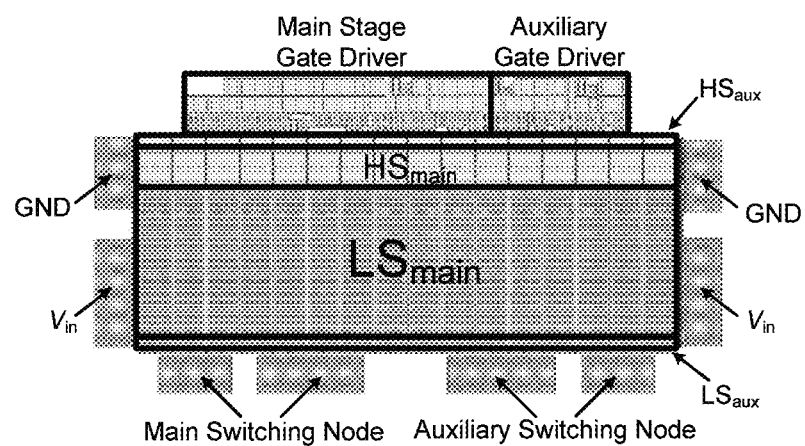
FIG. 11 is a sample layout of a typical output stage showing the relative sizes of the main and auxiliary output stages.

From the above analysis, it can be concluded that the size of the power transistors in the auxiliary output stage should be selected to ensure that $R_{on\_A}$ does not cause an excessively long auxiliary stage active time. Based on the knowledge of the maximum possible load transient, numerical analysis could be used to estimate the maximum allowable $R_{on\_A}$. For the buck converter under study, the required active times of different auxiliary output stages for heavy-to-light load transient with steps of 0.5 to 3 A are calculated and annotated in FIG. 10. The calculated recovery time of the main output stage under the same transient condition is also plotted for comparison. Since the converter is designed to handle load transient with magnitude up to 3 A, the upper bound of $R_{on\_A}$ should be about 0.5Ω, which means the auxiliary switches can be 20 times smaller than the main switch given that a 25 mΩ on-resistance main output stage is required to achieve a 93% peak power conversion efficiency. A sample layout of the dual output stages based on TSMC 0.25 µm 12 V technology is shown in FIG. 11. It should be noted that the physical size of the output stages includes metal connections and isolation guard rings which do not shrink proportionally with the actual size of MOSFETs. Thus the auxiliary stage occupies about 8% the total area rather than 4.8% if only the transistor size is considered.

While the size of auxiliary output stage must meet the criteria discussed above to ensure proper linear controller operation, optimized sizing for integrated auxiliary switches relies on the trade-offs between peak current and power loss in the auxiliary output stage. Small transistor size is preferable in terms of lower current peak since less number of bonding wires and I/O pins are needed for chip packaging. However, the increase in on-resistance and lengthened auxiliary stage active time will lead to a higher power loss during the transient recovery process. Therefore, heat dissipation should be taken into account for POL converters that undergoes frequent load transient. For the buck converter discussed above, increasing $R_{on\_A}$ from 0.1Ω to 0.5Ω results in 80% smaller size and 50% less current peak, but the amount of power lost on the auxiliary output stage is increased by 2.5 times.

As described above, PID control is suspended during the transient recovery process, thus the digital controller 16 loses the ability to regulate the duty-ratio with changing load current. When PID control is reactivated by the end of transient recovery, the duty-ratio the digital controller 16 holds is only applicable to the original load current before transient. If the controller starts with the stored duty-ratio, it will cause further output voltage deviation that may even exceed the voltage peak occurred during transient. This secondary voltage deviation is much more severe for integrated power stages due to the fact that they have larger loss elements compare to the discrete implementation. In order to mitigate this problem, the new steady-state duty-ratio after load transient needs to be predicted and applied to the PID control mode during the recovery process such that the output voltage settles to near steady state immediately after the PID control mode takes over. Accordingly, it is necessary for the digital controller 16 to predict and apply the new steady-state duty-cycle by the end of nonlinear transient recovery to achieve smooth transition back to linear PID mode.

To estimate the difference in duty-cycle before and after each load transient, the magnitude of transient step is needed, which is reflected by the output voltage slew-rate, as expressed below:

$$\Delta I_{out} \approx C_{out} \cdot \frac{dV_{out}}{dt}. \quad (19)$$

Figure 12:
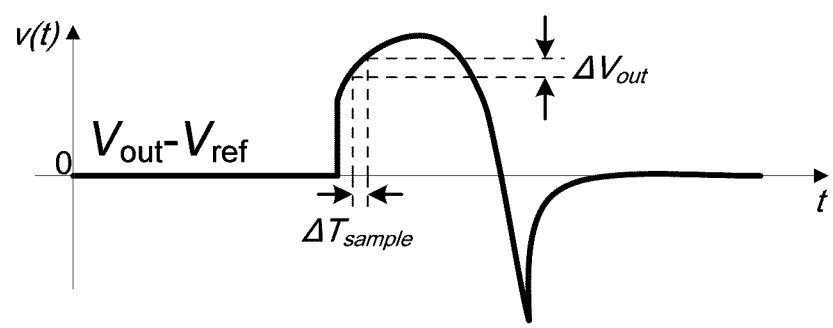
FIG. 12 illustrates the sensing of the output voltage slew-rate of the DC-DC converter illustrated in FIG. 1 in order to determine a duty-cycle prediction.

Two consecutive samples of $V_{out}$ are taken by the digital controller 16 at the beginning of the transient recovery process with sampling interval $\Delta T_{sample}$, as shown in FIG. 12. Thus Equation (19) is equivalent to:

$$\Delta I_{out} \approx \frac{1}{C_{out}} \cdot \frac{\Delta V_{out}}{\Delta T_{sample}}. \quad (20)$$

The difference in duty-cycle before and after the load transient is then estimated as:

$$\Delta D = \frac{\Delta I_{out} \cdot R_{loss}}{V_{in}} \approx \frac{R_{loss}}{C_{out} \cdot V_{in}} \cdot \frac{\Delta V_{out}}{\Delta T_{sample}}, \quad (21)$$

$R_{loss}$ is the equivalent series resistance in the power path. $R_{loss}/V_{in}$ can be calibrated by applying 1 A load current and calculate as shown below:

$$\frac{R_{loss}}{V_{in}} = D_{ideal} - D_{I_{out}=1A}, \quad (22)$$

where $D_{ideal}$ is the nominal $V_{out}/V_{in}$, and $D_{I_{out}=1A}$ is the actual duty-cycle when load current is 1 A. After getting $\Delta D$, the digital controller 16 applies the new steady-state duty-cycle by subtracting (in case of heavy-to-light load transient) $\Delta D$ from the duty-cycle previously saved.

A fully integrated DC-DC converter with on-chip digitally controlled dual output stages was designed and fabricated in accordance with the invention. The digital controller incorporated in the DC-DC converter was designed using TSMC 0.25 μm 2.5V standard cells. The output stages as well as the associated gate drivers were implemented with TSMC 0.25 μm 12V thick oxide devices. Each power transistor was divided into two identical segments with the gate driver located in the center. This layout strategy reduced the timing mismatch of gate signals to different fingers of the transistor. The main and auxiliary switching nodes were implemented in an interleaving structure so that the power stage current is evenly distributed. The on-resistance shown in Table II is just an example of design target. The actual value can vary and/or scale according to different technology and applications. For the prototype integrated DC-DC converter implemented, the simulated typical-case on-resistances of the power transistors under 12V gate-to-source voltage (−12V for PMOS) are shown as below

TABLE II

On-Resistances of the Power Transistors

| Name | On-Resistance |
|---|---|
| $HS_{Main}$ | 199 mΩ |
| $LS_{Main}$ | 16 mΩ |
| $HS_{Aux}$ | 485.1 mΩ |
| $LS_{Aux}$ | 90.3 mΩ |

While the main output stage transistors were designed to achieve around 90% peak efficiency, the auxiliary stage transistors were sized following the criteria discussed in integrated DC-DC converter with an auxiliary output stage for transient suppression", J. Wang, K. Ng, T. Kawashima, M. Sasaki, H. Nishio, A. Prodić, and W. T. Ng, in *Proc. Electron Device and Solid State Circuits*, November 2009, pp. 380-383, the content of which is incorporated herein by reference. It can be observed that the auxiliary output stage imposes less than 20% area overhead.

Figure 13:
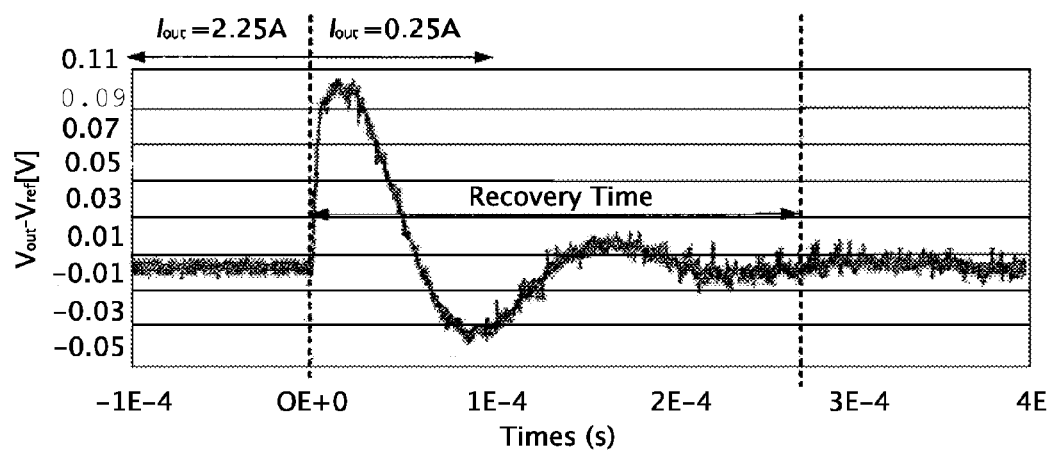
FIG. 13 illustrates dynamic response under a 2.25 A-to-0.25 A load transient using a conventional single-stage device.
Figure 14:
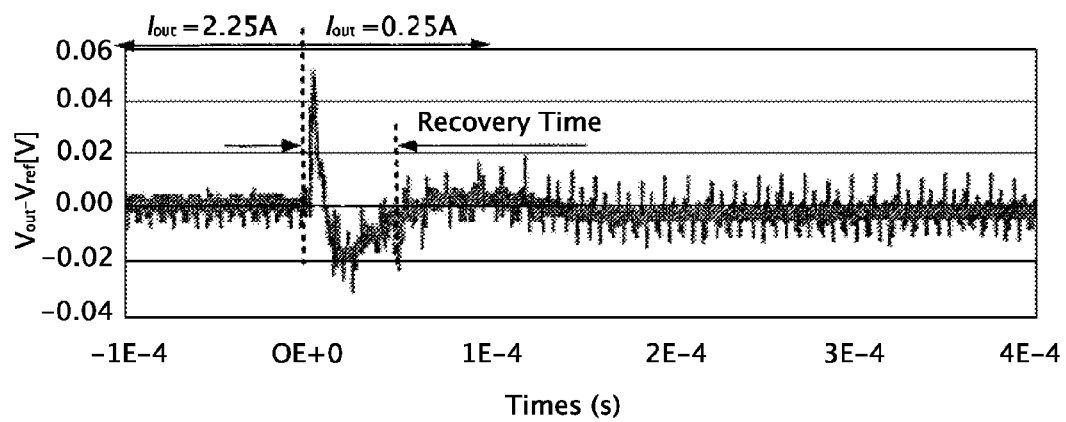
FIG. 14 illustrates dynamic response under a 2.25 A-to-0.25 A load transient using a dual output stages in accordance with the invention.

Transient performance of the prototype converter was measured under the test condition specified in Table III. Transient output voltage waveforms for a conventional single stage PID controller and the proposed dual-output-stage controller are compared in FIGS. 13 and 14. For a 2.25 A to 0.25 A load transient, a reduction in recovery time from 280 μs to 50 μs and in overshoot from 105 mV to 51 mV is observed. Since the auxiliary stage is disabled in steady-state, the two control methods should have similar efficiency profile.

TABLE III

Summary of Test Conditions

| Parameter | Value |
|---|---|
| Vin | 6 V |
| | (maximum 12 V) |
| Vout | 1 V |
| LM (main stage) | 2.2 μH |
| LA (aux stage) | 820 nH |
| Cout | 200 μF |
| Switching Frequency | 390 kHz |
| A/out | Switch from 2.25 A to 0.25 A |

The experimental results provided above shows that the present invention can reduce the transient overshoot by 50% and recovery time by 80% while maintaining similar efficiency when comparing to a conventional single-stage linear converter. Further, the provision of the auxiliary converter output stage imposes less than 20% area overhead.

The invention has been described with reference to certain preferred embodiments thereof. It will be understood, however, that modifications and variations are possible within the scope of the appended claims. For example, the digital processor has been described as operating in a linear control mode and a non-linear control mode. It will be understood that the functions performed by the digital processor can be implemented utilizing one or more programmable devices or discrete components.

What is claimed is:

1. A DC-DC converter comprising:
a main converter output stage;
an auxiliary converter output stage connected in parallel to the main converter output stage; and
a digital controller coupled to the main converter output stage and the auxiliary converter output stage that operates in a linear controller mode when no load transient is present and operates in a non-linear controller mode when a load transient is detected;
wherein the digital controller senses an output voltage slew-rate when the load transient is detected and determines a duty-ratio prediction that is applied in the linear controller mode to ensure smooth transition from the nonlinear controller mode back to the linear controller mode; and
wherein an on-resistance of auxiliary converter output stage power transistors provided in the auxiliary converter output stage is such that the active time of the auxiliary converter output stage is less than the recovery time of the main converter stage.

2. The DC-DC converter as claimed in claim 1, wherein the upper bound of the on-resistance is the upper bound is about $0.5\ \Omega$.

3. The DC-DC converter as claimed in claim 1, wherein the main converter output stage and the auxiliary converter output stage each include a high side switch, a low side switch and an inductor.

4. The DC-DC converter as claimed in claim 1, wherein the digital controller disables the auxiliary converter output stage when no load transient is detected and the DC-DC converter is operated in a steady state condition.

5. A DC-DC converter comprising:
a main converter output stage;
an auxiliary converter output stage connected in parallel to the main converter output stage; and
a digital controller coupled to the main converter output stage and the auxiliary converter output stage that operates in a linear controller mode when no load transient is present and operates in a non-linear controller mode when a load transient is detected;
wherein the digital controller senses an output voltage slew-rate when the load transient is detected and determines a duty-ratio prediction that is applied in the linear controller mode to ensure smooth transition from the nonlinear controller mode back to the linear controller mode,
wherein the linear controller mode is a proportional-integral-derivative controller mode; and
wherein the inductance ratio of the main converter output stage to the auxiliary converter output stage ($L_M/L_A$) is such that, during transient recovery, the induced output voltage undershoot $\Delta V_{Undershoot}$ is always less than or equal to the output voltage $\Delta V_{Overshoot}$ overshoot.

6. A method of operating a DC-DC converter that includes an auxiliary converter output stage connected in parallel to the main converter output stage, and a digital controller coupled to the main converter output stage and the auxiliary converter output stage that operates in a linear controller mode when no load transient is present and operates in a non-linear controller mode when a load transient is detected, the method including:
operating the digital controller in a linear control mode when no load transient is detected by the digital controller in order to maintain the DC-DC converter in a steady state condition;
activating the digital controller to operate in a non-linear control mode when a load transient is detected by the digital controller;
performing load-step sensing using the digital controller;
generating switching commands for the main converter output stage and the auxiliary converter output stage with the digital controller based on the load-step sensing;
performing a duty-ratio prediction with the digital controller and applying it to the linear control mode to ensure a smooth transition from the non-linear control mode to the linear control mode;
wherein the inductance ratio of the main converter output stage to the auxiliary converter output stage ($L_M/L_A$) is such that, during transient recovery, the induced output voltage undershoot $\Delta V_{Undershoot}$ is always less than or equal to the output voltage $\Delta V_{Overshoot}$ overshoot.

7. A method of operating a DC-DC converter that includes an auxiliary converter output stage connected in parallel to a main converter output stage, and a digital controller coupled to the main converter output stage and the auxiliary converter output stage that operates in a linear controller mode when no load transient is present and operates in a non-linear controller mode when a load transient is detected, the method including:
operating the digital controller in a linear control mode when no load transient is detected by the digital controller in order to maintain the DC-DC converter in a steady state condition;
activating the digital controller to operate in a non-linear control mode when a load transient is detected by the digital controller;
performing load-step sensing using the digital controller;
generating switching commands for the main converter output stage and the auxiliary converter output stage with the digital controller based on the load-step sensing;
performing a duty-ratio prediction with the digital controller and applying it to the linear control mode to ensure a smooth transition from the non-linear control mode to the linear control mode;
wherein an on-resistance of auxiliary converter output stage power transistors provided in the auxiliary converter output stage is such that the active time of the auxiliary converter output stage is less than the recovery time of the main converter stage.

8. The method of operating a DC-DC converter as claimed in claim 7, wherein the linear control mode is a proportional-integral-derivative control mode.

9. The method of operating a DC-DC converter as claimed in claim 7, further comprising introducing a blocking state until the output voltage of the converter settles to steady state.

* * * * *